US008170611B2

(12) United States Patent
Ballai

(10) Patent No.: US 8,170,611 B2
(45) Date of Patent: May 1, 2012

(54) INTERNAL ACCESSORY ANTENNA SYSTEM AND METHOD FOR WIRELESS NETWORK

(75) Inventor: Philip N. Ballai, San Jose, CA (US)

(73) Assignee: Symbol Technologies, Inc., Holtsville, NY (US)

(*) Notice: Subject to any disclaimer, the term of this patent is extended or adjusted under 35 U.S.C. 154(b) by 1837 days.

(21) Appl. No.: 10/235,073

(22) Filed: Sep. 4, 2002

(65) Prior Publication Data

US 2004/0204077 A1 Oct. 14, 2004

(51) Int. Cl.
*H04B 1/38* (2006.01)

(52) U.S. Cl. .................... 455/557; 455/41.2; 455/550.1; 455/553.1; 455/556.1; 455/575.7

(58) Field of Classification Search .................. 455/557, 455/41.1, 562.1, 280, 553.1, 90.3, 13.3, 13.1, 455/11.1, 550.1, 575.7, 575.8, 129
See application file for complete search history.

(56) References Cited

U.S. PATENT DOCUMENTS

| | | | | |
|---|---|---|---|---|
| 5,048,117 | A * | 9/1991 | Aisaka et al. | 455/571 |
| 5,731,757 | A * | 3/1998 | Layson, Jr. | 340/573.1 |
| 5,880,868 | A * | 3/1999 | Mahany | 398/115 |
| 2001/0041541 | A1* | 11/2001 | Nokkonen et al. | 455/83 |
| 2002/0016188 | A1* | 2/2002 | Kashiwamura | 455/568 |
| 2002/0080866 | A1* | 6/2002 | Bouet et al. | 375/220 |
| 2002/0183032 | A1* | 12/2002 | Fang | 455/280 |
| 2003/0040332 | A1* | 2/2003 | Swartz et al. | 455/553 |
| 2003/0092396 | A1* | 5/2003 | Fifield | 455/80 |
| 2003/0181165 | A1* | 9/2003 | Sugar et al. | 455/69 |
| 2004/0042421 | A1* | 3/2004 | Mahany | 370/320 |
| 2004/0121801 | A1* | 6/2004 | Tom | 455/556.1 |
| 2004/0166895 | A1* | 8/2004 | Koenck et al. | 455/556.1 |
| 2004/0225786 | A1* | 11/2004 | Puupponen et al. | 710/240 |
| 2006/0252373 | A1* | 11/2006 | Huh et al. | 455/41.2 |

* cited by examiner

*Primary Examiner* — Dai A Phuong

(57) ABSTRACT

Described is a method and system which includes an arrangement including an internal wireless communication antenna and a wireless communication device couplable to one of an external wireless communication antenna and the arrangement. When the arrangement is attached to the device, the device is capable of unitizing either first or second wireless channels. When the arrangement is not attached to the device, the device utilizes only the second channel.

18 Claims, 3 Drawing Sheets

INTERNAL ACCESSORY ANTENNA SYSTEM AND METHOD FOR WIRELESS NETWORK

BACKGROUND INFORMATION

An IEEE 802.11a protocol is a new specification that represents the next generation of Wireless Local Area Networks ("WLANs"). The IEEE 802.11a protocol uses 300 MHz of bandwidth allocated by the Federal Communications Commission ("FCC") for what is called Unlicenced National Information Infrastructure ("UNII"). A WLAN implementing the 802.11a protocol can transmit at rates up to 54 Mbps.

The 300 MHz of bandwidth is divided into three 100 MHz bands, each one having different regulatory limitations. The first or lower band ("UNII-1") (i.e., from 5.15-5.25 Gigahertz ("GHz")), may transmit at a maximum power of 50 milliwatts ("mW") and only use an antenna that is "captive" (i.e., internal or fixed) to a transmission unit (e.g., a mobile unit ("MU") or access point ("AP")). The second or middle band ("UNII-2") (i.e., from 5.25-5.35 GHz) may transmit at a maximum power of 250 mW. The third or upper band ("UNII-3") (i.e., from 5.725-5.825 Ghz) and use the internal or external antenna, may transmit at a maximum power of 1 W. Each of the lower and middle bands (i.e., UNII-1 and UNII-2) has four operating channels. These regulatory specifications have been determined by the FCC and the use and limitations of the bandwidth may vary from country to country.

When installing the WLAN several APs may be necessary to optimally cover a desired area. Each AP is assigned a specific channel to communicate with MUs so that there is no interference with the other APs communications. If more than four channels are necessary to prevent an interference (e.g., eight APs are needed to cover an area and all the APs must use different channels), then the WLAN must use UNII-1 as well as UNII-2 channels. Due to the "captive" antenna regulatory requirements for UNII-1, a different AP which uses UNII-2 channels must be used. This sacrifices the versatility of purchasing a single AP product that can be used for all wireless networking needs.

Alternatively, only AP units with "captive" antennas may be used for all channels. Such AP units sacrifice improved coverage that may be achieved when using UNII-1 and UNII-2 channels with external antennas. Therefore, there is a need for APs that can comply with the FCC regulation of "captive" antennas for UNII-1 channels with the flexibility of using external antennas for UNII-2 channels. Similarly, there is a need for APs that have the flexibility to comply with the varying regulations of different countries for the UNII-1 and UNII-2 bands.

SUMMARY OF THE INVENTION

The present invention relates to is a method and system which includes an arrangement including an internal wireless communication antenna and a wireless communication device couplable (e.g., an 802.11a access point) to one of an external wireless communication antenna and the arrangement. The external antenna may have a longer range than the internal antenna.

When the arrangement is attached to the device, the device is capable of unitizing either first or second wireless channels. When the arrangement is not attached to the device, the device utilizes only the second channel.

The device may include a switch activated when the arrangement is attached to the device and at least one antenna connector. The external antenna may be coupled to the device using the at least one antenna connector. In addition, the arrangement may include at least one further connector and it may be coupled to the device using the at least one connector and the at least one further connector.

DETAILED DESCRIPTION

Figure 1:
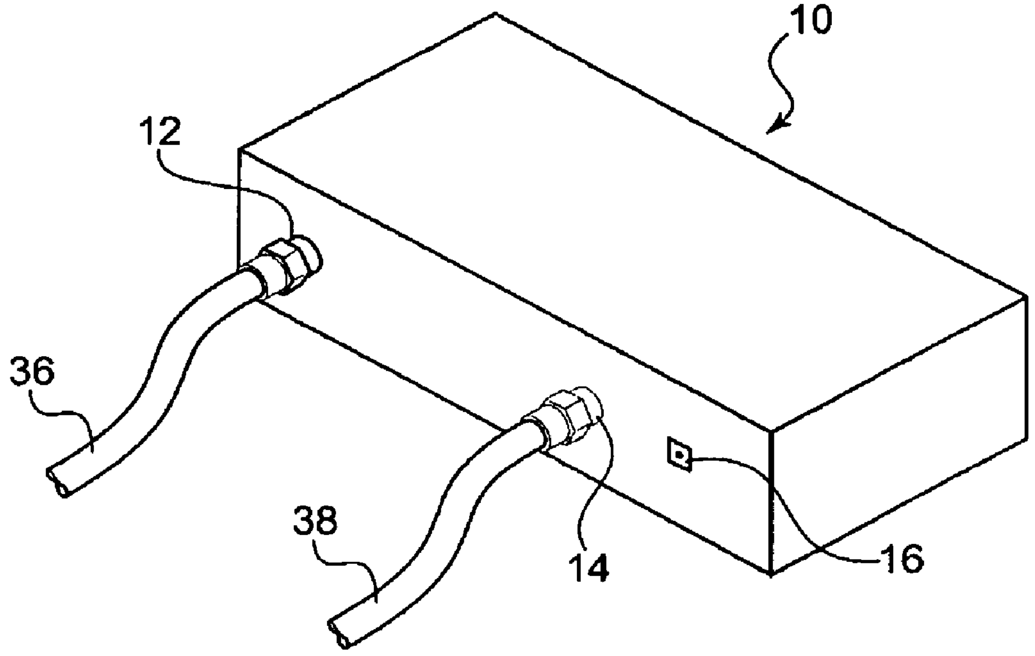
FIG. 1 shows an exemplary embodiment of an access point according to the present invention.

FIG. 1 shows an exemplary embodiment of an access point ("AP") 10 according to the present invention. The AP 10 may contain a plurality of antenna connectors 12 and 14. Each of the antenna connectors 12-14 may be connected to cables 36 and 38 that are attached to a conventional external antenna (not shown). Internally, the AP 10 may contain a computing arrangement that runs a channel assignment program as well as other programs.

In addition, the AP 10 may include a micro-switch 16 that may be located proximal to one or both of the antenna connections 12-14. The micro-switch 16 may be placed, for example, inside the AP 10 with only a small entry hole making it accessible. This prevents the micro-switch 16 from being inadvertently activated (i.e., closed). In the configuration illustrated in FIG. 1, the micro-switch 16 is open indicating to the AP 10 that the external antennas are being used. The AP 10 allows only use of the UNII-2 channels when the micro-switch 16 is open in order to comply with the FCC regulations.

Figure 2A:
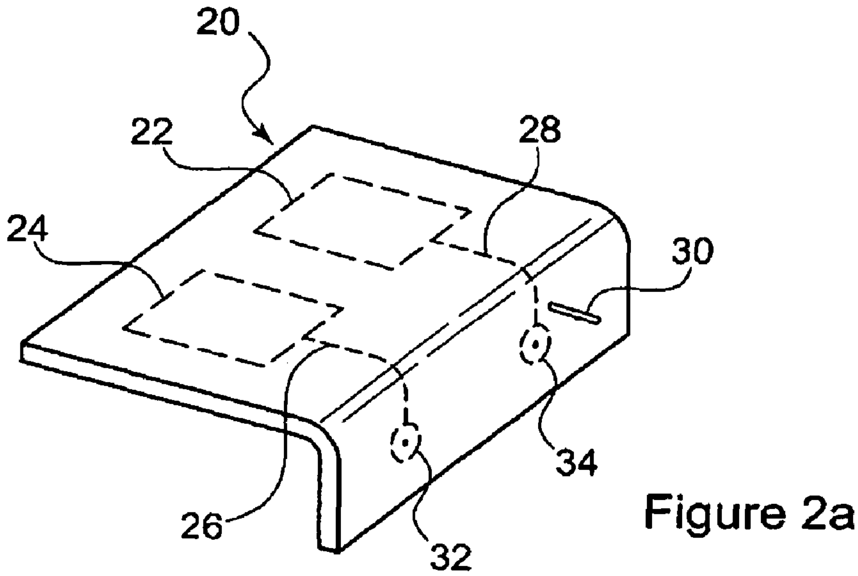
FIG. 2*a* shows an exemplary embodiment of an internal accessory antenna arrangement according to the present invention.

FIG. 2*a* shows an exemplary embodiment of an internal accessory antenna arrangement ("IAAA") 20 according to the present invention. The IAAA 20 may contain a plurality of captive antennas 22-24. The captive antennas 22-24 may be connected to internal cables 26-28 that are attached to internal antenna connectors 32-34. The IAAA 20 may also contain an appurtenance 30, which may be, for example, a plastic extrusion or a metal lead, adapted to fit in the entry hole and close the micro-switch 16.

The internal antenna connectors 32-34 are adapted to connect to the antenna connectors 12-14 (e.g., they may be the same type of connectors (e.g., SMA connectors), but of the opposite gender). The internal antenna connectors 32-34 are aligned on the IAAA 20 allowing the internal connectors 32-34 to attach to the antenna connectors 12-14. The appurtenance 30 is aligned on the IAAA 20 so that it closes the micro-switch 16 when the IAAA 20 is attached to the AP 10.

Figure 2B:
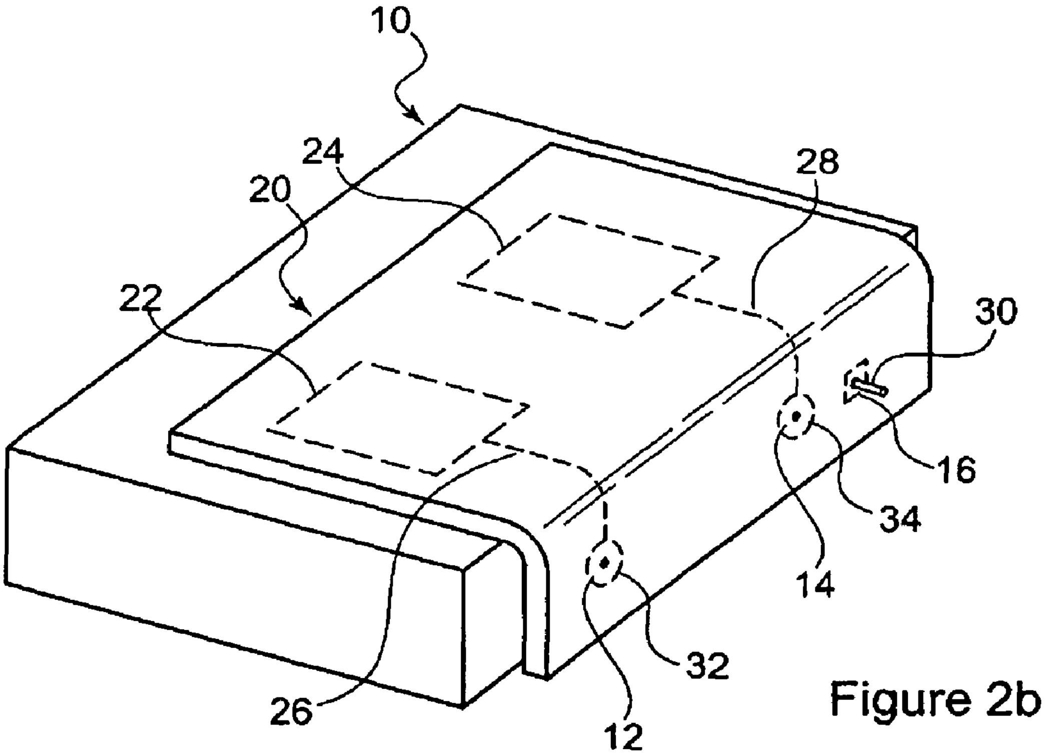
FIG. 2*b* shows an exemplary embodiment of the access point with the internal accessory antenna arrangement attached according to the present invention.

FIG. 2*b* shows an exemplary embodiment of the IAAA 20 mounted on the AP 10 according to the present invention. In this configuration, the IAAA 20 becomes part of the base unit mechanically and completely encapsulates the antenna connectors 12-14. The attachment of the IAAA 20 may be analogized, for example, to the attachment of a battery to a cell phone. Generally, the cell phone battery is external to the cell phone; however, when attached the battery becomes an integral part of the cell phone shape, as well as its function.

In the configuration illustrated in FIG. 2*b*, the micro-switch 16 is depressed indicating to the AP 10 that the IAAA 20 is being used. The AP 10, therefore, allows the use of the UNII-1 channels, as well as the UNII-2 channels for channel assignments. The AP 10 is in compliance with the FCC regulation, because the IAAA 20 acts as a “captive” antenna, allowing use of the UNII-1 channels only when the IAAA 20 is attached.

Figure 3:
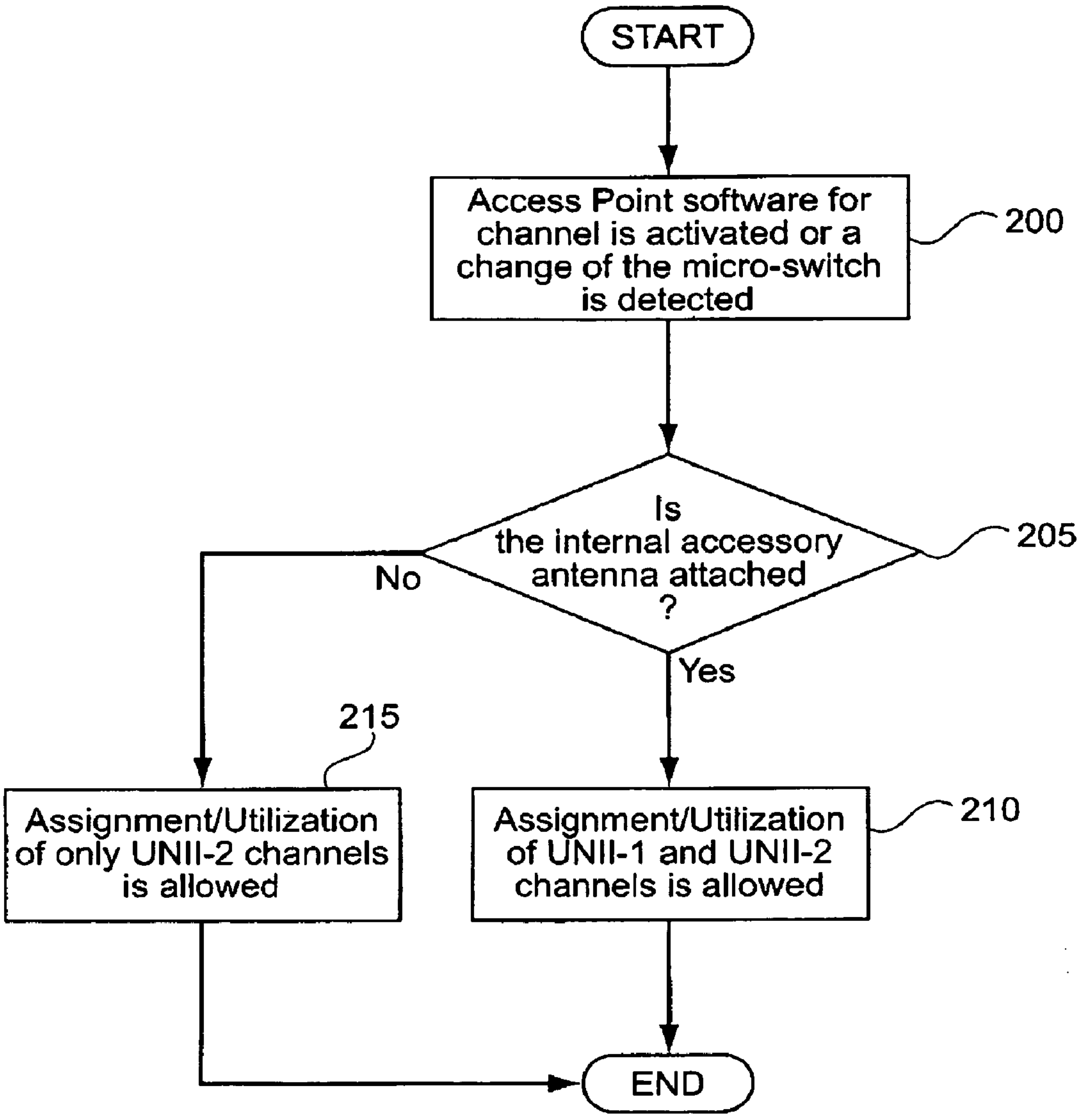
FIG. 3 shows an exemplary method according to the present invention.

FIG. 3 shows a method according to the exemplary embodiment of the present invention. The method is described with reference to FIGS. 1, 2*a* and 2*b*. Those skilled in the art will understand that other systems having varying configurations may be used to implement the exemplary method.

One manner of initiating the exemplary method is activation of a channel assignment program (Step 200). The channel assignment program may be used when setting up or changing the WLAN configuration. When doing so, a channel is assigned to the AP 10 so that it neither interferes with other APs nor do other APs interfere with it. In order to ensure compliance with the FCC regulation, the exemplary method performs a check of the channel assignment. When the channel assignment program is initiated it first runs the exemplary method to determine which channels are available from a regulatory perspective.

Another manner of initiating the method is a detection of a change in the status of the micro-switch 16 (i.e., closed to open or open to closed.) When such a change occurs, the IAAA 20 has either been attached or removed from the AP 10. If a UNII-1 channel has been assigned to the AP 10, it either ceases or resumes transmitting based on the outcome of the method.

In step 205, the AP 10 determines whether the IAAA 20 is attached. This is determined by checking the state (i.e., open or closed) of the micro-switch 16. If the micro-switch 16 is closed, then the IAAA 20 is attached as shown in FIG. 2*b*, and the method continues with step 210.

In step 210, the AP 10 allows to utilize any UNII-1 and UNII-2 channels. If the method was initiated by the channel assignment program, then the user is given an option to assign an appropriate channel. If the method was initiated by the changing state of the micro-switch 16, then the AP 10 resumes transmission if it had been assigned the channel.

In step 215, if it had been determined in Step 205 that the IAAA 20 is not attached as shown in FIG. 1, the AP 10 does not allow transmission using the UNII-1 channels. Thus, the AP 10 allows transmission using only the UNII-2 channels. If the method was initiated by the channel assignment program, then the user is not giv8en the option of assigning a UNII-1 channel. If the method was initiated by the changing state of the micro-switch 16, then the AP 10 ceases transmission if it had been assigned a UNII-1 channel.

The above exemplary method allows the AP 10 to comply with the FCC regulations. At the same time, the AP 10 retains the capability of using external, and possibly higher gain, antennas when using the UNII-2 channels. This provides customers who require use of all eight channels, a single product that can satisfy their needs.

In an alternative exemplary method the same embodiment may be used to comply with the varying regulations in other countries. A configuration software package may accompany the AP 10 to allow a user to configure it. When initially configuring the AP 10, the configuration software preset with the country’s particular limitations, downloads the information to the AP 10. The values for power for the different bands, as well as the exact specifications for what would be allowed in step 210 and disallowed in step 215 would be modified. This provides customers who need to install WLANs worldwide, a single product that can satisfy their needs.

The present invention has been described with reference to an embodiment with the AP 10 implementing the IEEE 802.11a protocol, having dual external antenna connectors, as well as other specific characteristics. One skilled in the art would understand, though, that the present invention may also be successfully implemented, for example, with a different protocol that required a similar “captive” antenna limitation or instead of the AP 10 with a mobile unit. Accordingly, various modifications and changes may be made to the embodiments without departing from the broadest spirit and scope of the present invention as set forth in the claims that follow.

What is claimed is:

1. A system, comprising:

an arrangement including an internal wireless communication antenna; and a wireless communication access point couplable to one of an external wireless communication antenna and the arrangement, wherein, when the arrangement is attached to the access point, the access point utilizes one of at least one first wireless channel and at least one second wireless channel, and wherein, when the arrangement is not attached to the access point, the access point vice utilizes the at least second channel and prevents transmission using the at least first channel, wherein the access point utilizes IEEE 802.11a protocol, the at least one first channel including four Unlicenced National Information Infrastructure (UNII) lower band channels, the at least second channel including at least four UNII middle band channels.

2. The system according to claim 1, wherein the access point includes a switch activated when the arrangement is attached to the access point.

3. The system according to claim 1, wherein the access point includes at least one antenna connector.

4. The system according to claim 3, wherein the external antenna is coupled to the access point using the at least one antenna connector.

5. The system according to claim 3, wherein the arrangement includes at least one further connector, the arrangement being coupled to the access point using the at least one connector and the at least one further connector.

6. The system according to claim 1, wherein the external antenna has a longer communication range than the internal antenna.

7. A method, comprising the steps of:

determining whether an arrangement is attached to a wireless communication access point, the arrangement including an internal antenna, the access point couplable to one of an external wireless communication antenna and the internal antenna;

utilizing by the access point one of at least one first wireless channel and at least one second wireless channel when the arrangement is attached to the access point; and utilizing by the access point the at least one second channel, and preventing by the access point transmission using the at least one first channel, when the arrangement is not attached to the access point, wherein the access point utilizes IEEE 802.11a protocol, the at least one first channel including four Unlicenced National Information Infrastructure (UNII) lower band channels, the at least second channel including at least four UNII middle band channels.

8. The method according to claim 7, wherein the access point includes a switch, the switch being activated when the arrangement is attached to the access point, the determined step includes the substep of:

checking a status of the switch to determine if the arrangement is attached to the access point.

9. The method according to claim 7, wherein the access point includes at least one antenna connector.

10. The method according to claim 9, further comprising the step of:

coupling the external antenna to the access point using the at least one antenna connector.

11. The method according to claim 9, wherein the arrangement includes at least one further connector, the method further comprising the step of:

coupling the arrangement to the access point using the at least one connector and the at least one further connector.

12. The method according to claim 7, wherein the external antenna has a longer range than the internal antenna.

13. An arrangement, comprising:

an internal wireless communication antenna, wherein a wireless communication access point is couplable to one of an external wireless communication antenna and the arrangement, the arrangement including the internal antenna, wherein when the arrangement is attached to the access point, the access point is capable of utilizing one of at least one first wireless channel and at least one second wireless channel, and wherein when the arrangement is not attached to the access point, the access point utilizes the at least second channel and prevents transmission using the at least first channel, wherein the access point utilizes IEEE 802.11a protocol, the at least one first channel including four Unlicenced National Information Infrastructure (UNII) lower band channels, the at least second channel including at least four UNII middle band channels.

14. The arrangement according to claim 13, wherein the access point includes a switch activated when the arrangement is attached to the access point.

15. The arrangement according to claim 13, wherein the access point includes at least one antenna connector.

16. The arrangement according to claim 15, wherein the external antenna is coupled to the access point using the at least one antenna connector.

17. The arrangement according to claim 15, further comprising:

at least one further connector, wherein the arrangement is coupled to the access point using the at least one connector and the at least one further connector.

18. The arrangement according to claim 13, wherein the external antenna has a longer range than the internal antenna.

* * * * *